United States Patent [19]
Li

[11] Patent Number: 6,130,959
[45] Date of Patent: Oct. 10, 2000

[54] ANALYZING AN IMAGE OF AN ARRANGEMENT OF DISCRETE OBJECTS

[75] Inventor: David Li, West Roxbury, Mass.

[73] Assignee: Cognex Corporation, Natick, Mass.

[21] Appl. No.: 08/997,925

[22] Filed: Dec. 24, 1997

Related U.S. Application Data

[63] Continuation-in-part of application No. 08/895,052, Jul. 16, 1997.

[51] Int. Cl.[7] .............................. G06K 9/42; G06K 9/80; G06T 7/60
[52] U.S. Cl. .......................... 382/150; 382/151; 382/201; 382/289
[58] Field of Search .................................. 382/145–151, 382/201, 216, 219, 278, 282, 289, 296, 124, 125, 126, 127; 348/87, 126, 94, 130; 250/559.2, 559.34, 559.37, 559.39, 559.4, 559.46; 702/40, 82, 150, 151; 356/375, 237.4, 237.5

[56] References Cited

U.S. PATENT DOCUMENTS

| | | | |
|---|---|---|---|
| 3,614,736 | 10/1971 | McLaughlin | 340/146.3 Q |
| 3,638,188 | 1/1972 | Pincoffs et al. | 340/146.3 AC |
| 4,802,230 | 1/1989 | Horowitz | 382/22 |
| 4,975,969 | 12/1990 | Tal | 382/2 |
| 5,054,094 | 10/1991 | Barski | 382/18 |
| 5,063,605 | 11/1991 | Samad | 382/44 |
| 5,291,560 | 3/1994 | Daugman | 382/2 |
| 5,465,152 | 11/1995 | Bilodeau et al. | 356/371 |
| 5,550,763 | 8/1996 | Michael et al. | 364/582 |
| 5,574,668 | 11/1996 | Beaty | 364/558 |
| 5,574,801 | 11/1996 | Collet-Beillon | 382/150 |
| 5,652,658 | 7/1997 | Jackson et al. | 356/398 |
| 5,694,482 | 12/1997 | Maali et al. | 382/151 |
| 5,719,959 | 2/1998 | Krtolica | 382/209 |
| 5,862,973 | 1/1999 | Wasserman | 228/105 |

FOREIGN PATENT DOCUMENTS

WO95/11519  4/1995  WIPO .

OTHER PUBLICATIONS

Deley et al., "Accurate Placement of Ball Grid Array Packages," reprinted from *Electronic Packaging & Production*, Apr. 1996, Cahners Publishing Company, Newton, MA, USA.

University of Waterloo Computer Graphics Lab, "Affine Transformations," http://www.undergrad.math.uwaterloo.ca/~cs488/In.HTML/Affinenode4.html, pp. 1–3.

Hager, William W., "Chapter 6 Eigenproblems, Section 6–11 The Singular Value Decomposition and the Pseudoinverse," *Applied Numerical Linear Algebra*, 1988, pp. 294–303, Prentice Hall, Englewood Cliffs, NJ, USA.

Thomas, Jr., George B., "Chapter 14 Partial Differentiation," *Calculus and Analytic Geometry*, 1953, pp. 481–532, Addison–Wesley Publishing Company, Inc., Cambridge, MA, USA.

Cognex Corporation, Chapter 7 Mathematics, Coordinate Transformation by Pseudoinverse, *Cognex 3000/4000/5000 System Software*, 1996, pp. 204–210, Revision 7.4 590–0134, Natick, MA.

Cognex Corporation, "Chapter 1 Searching, Correlation Searching," *Cognex 3000/4000/5000 Vision Tools*, 1996, pp. 17–25, Revision 7.4 590–0136, Natick, MA.

(List continued on next page.)

*Primary Examiner*—Leo H. Boudreau
*Assistant Examiner*—Brian P. Werner
*Attorney, Agent, or Firm*—Anthony L. Miele; Russ Weinzimmer

[57] ABSTRACT

An arrangement of discrete objects is analyzed. First and second characteristics are extracted from an actual arrangement of discrete objects and an ideal arrangement of points, respectively, and the first and second characteristics are compared. Each characteristic is invariant, to within an angular constant, under an affine transformation of the respective arrangement.

3 Claims, 13 Drawing Sheets

OTHER PUBLICATIONS

Cognex Corporation, "Chapter 11 Ball Grid Array Device Inspection," *SMD Placement Guidance Product User's Manual*, 1996, pp. 213–246, Release 2.3.00 590–1039, Natick, MA.

Ballard, D.H., "Generalizing the Hough Transform to Detect Arbitrary Shapes*," *Pattern Recognition*, 1981, pp. 111–122, vol. 13, No. 2, Pergamon Press Ltd., UK.

ICOS Vision Systems, Inc., "ICOS 2–Dimensional BGA Inspection System," specification sheet, pp. 1–6, Waltham, MA, USA.

ICOS Vision Systems, Inc., "ICOS Component Checker for BGA Inspection," specification sheet, Waltham, MA, USA.

Strang, Gilbert, "Chapter 3 Orthogonal Projections and Least Squares, Section 3.4 The Pseudoinverse and the Singular Value Decomposition," *Linear Algebra and Its Applications, Second Edition*, 1980, Academic Press, Inc., New York, NY, USA.

R.A. Hoogenboom, "Normalized Correlation Coefficient," *http://www.wi.leidenuniv.nl./~rhoogenb/node26.html*, pp. 1–2.

Caracappa, Ed., "On Improving BGA Reliability and Quality," *Surface Mount Technology Magazine*, Jun. 1997, pp. 44–46, Libertyville, IL, USA.

Silver et al., "Practical Golden Template Comparison," *Cognex Corporation*, Jun. 6, 1990, pp. 2–11, Needham, MA, USA.

"RVSI Vanguard Products," *http://www.vai.net/products/products.htm*, pp. 1–2.

"RVSI Vanguard VAi 5020," *http://www.vai.net/products/prod01.htm*, pp. 1–4.

"RVSI Vanguard VAi 5200/VAi 5300," *http://www.vai.net/products/prod02.htm*, pp. 1–4.

"RVSI Vanguard VAi 6300," *http://www.vai.net/products/6300.htm*, pp. 1–5.

Grimson et al., "On the Sensitivity of the Hough Transform for Object Recognition," *IEEE Transactions on Pattern Analysis and Machine Intelligence*, Mar. 1990, pp. 255–274, vol. 12. No. 3.

Jurgen Altmann et al., A Fast Correlation Method for Scale — and Translation — Invariant Pattern Recogition, IEEE Transactions on Pattern Analysis and Machine Intelligence, vol. PAMI–6, No. 1, pp. 46–57, Jan. 1984.

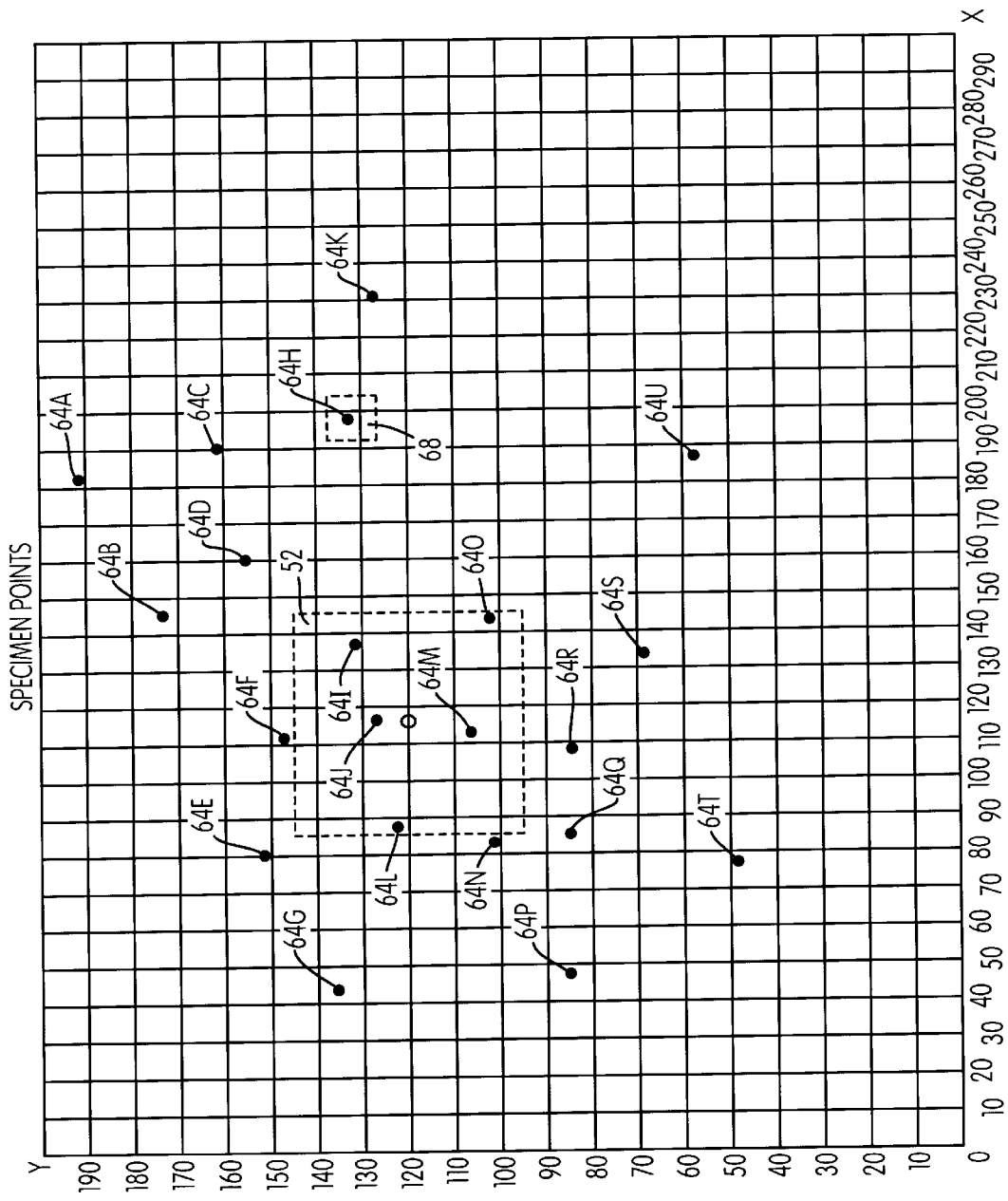

REFERENCE POLAR SIGNATURE

SPECIMEN POLAR SIGNATURE

| REFERENCE POINT | SPECIMEN POINT |
|---|---|
| 50A | 64A |
| 50B | 64B |
| 50C | 64E |
| 50D | 64G |
| 50E | 64F |
| 50F | 64D |
| 50G | 64C |
| 50H | 64L |
| 50I | 64J |
| 50J | 64I |
| 50K | 64H |
| 50L | 64N |
| 50M | 64M |
| 50N | 64K |
| 50O | 64P |
| 50P | 64O |
| 50Q | 64R |
| 50R | |
| 50S | 64S |
| 50T | 64T |
| 50U | 64U |
| | 64Q |

CORRESPONDENCE DATA

FIG. 11

ANALYZING AN IMAGE OF AN ARRANGEMENT OF DISCRETE OBJECTS

CROSS REFERENCE TO RELATED APPLICATIONS

This application is a continuation-in-part of U.S. Application Ser. No. 08/895,052, filed Jul. 16, 1997, incorporated by reference.

BACKGROUND OF THE INVENTION

The invention relates to analyzing an image of an arrangement of discrete objects.

The usefulness of a product expected to include items or attributes in a predetermined arrangement is diminished by a defect relating to the arrangement. If the product is meant to be a component in another product, this defect may ruin the other product.

For this reason, products incorporating such items or attributes in such predetermined arrangements may be inspected for compliance with some standard. Examples of products appropriate for inspection include ball grid array devices, micro-ball grid arrays, flip chips, and chip-scale packages (together called "BGAs"). BGAs share a common feature in that the contacts on the device are metallic balls that are mounted on one side of the device for forming electrical connections between the package's integrated circuit and a printed circuit board.

To work properly, the balls of BGAs should be properly located to connect to the pads on the circuit board. The balls also should be properly formed (i.e., should have a spherical shape and neither too much nor too little solder, to allow an acceptable electrical connection). The balls also should not be connected by extraneous solder or other material in the spaces between the balls. If these conditions are not met, the BGA may fail to make proper electrical connections or durable physical bonds.

Unlike traditional leaded devices that have contacts exposed on perimeters where some types of defects (e.g., solder bridges or missing solder) can be detected even after soldering, BGAs are harder to inspect after mounting on a circuit board. BGAs therefore are inspected before mounting, either in fully-assembled form or by inspection of ball arrays that are about to be attached to the packages of integrated circuits.

Inspections are done on other types of products, e.g., pill blister packs and candy sampler boxes.

Typically, such inspections are conducted according to a "brute force" correspondence-finding method in which the amount of computational resources required is at least roughly proportional to the factorial of the number of objects of interest that are associated with each device to be inspected (e.g., where 3,628,800 processing cycles are required for a device having 10 objects of interest, more than $2.4 \times 10^{18}$ such cycles are required for an object having 20 objects of interest). Where the number of objects of interest is large, a lack of sufficient computational resources may impede the quick identification of missing and extra objects in the actual arrangement. Also, in a real-time inspection application, the brute force method may leave little time for analyzing the quality of other objects found in the actual arrangement.

SUMMARY OF THE INVENTION

In general, in one aspect, the invention features a method for use in analyzing arrangements of discrete objects. The method includes extracting a first characteristic from an actual arrangement of discrete objects and a second characteristic from an ideal arrangement of points, each characteristic being invariant, to within an angular constant, under an affine transformation of the respective arrangement, and comparing the first and second characteristics.

Implementations of the invention may include one or more of the following features. The method may further include deriving the actual arrangement from image data, or, based on the comparison, searching for an object of the actual arrangement that corresponds to an object of the ideal arrangement. At least one of the discrete objects may include a BGA ball. The actual arrangement may include a BGA array. The comparison may involve a subset of the objects of the actual arrangement. Each characteristic may include an angular relationship between objects of the arrangement. The affine transformation may include a scalar or a translation transformation. The method may further include selecting an area of the actual arrangement that corresponds to a relatively denser area of the ideal arrangement, and basing the extraction on the selected area; basing the search on a transform that describes an affine relationship between the actual and ideal arrangements; or based on the transform, determining an area in the actual arrangement in which to search for an object. The method may further include increasing a score when an object in the actual arrangement is found to correspond to an object in the ideal arrangement; terminating the search and rejecting any correspondences found if the search fails to find at least a minimum number of correspondences; or if the search finds a specified number of correspondences, terminating the search and accepting the correspondences found. The method may further include if the search finds a specified number of correspondences, terminating the search and retaining the correspondences found for subsequent evaluation with respect to the results of a subsequent search; or based on the comparison, determining whether the actual arrangement lacks an object corresponding to an object in the ideal arrangement or has an object that lacks a corresponding object in the ideal arrangement.

In general, in another aspect, the invention features apparatus for use in analyzing arrangements of discrete objects. The apparatus includes an extractor extracting a first characteristic from an actual arrangement of discrete objects and a second characteristic from an ideal arrangement of discrete objects, each characteristic being invariant, to within an angular constant, under an affine transformation of the respective arrangement, and a comparator comparing the first and second characteristics.

Implementations of the invention may include one or more of the following features. At least one of the discrete objects may include a BGA ball. The actual arrangement may include a BGA array.

In general, in another aspect, the invention features a method of analyzing an actual arrangement of discrete objects. The method includes comparing the actual arrangement to an ideal arrangement of discrete objects, and applying different amounts of processing resources to different portions of the arrangement at different steps in the comparison.

In general, in another aspect, the invention features a system for use in analyzing an actual arrangement of discrete objects with respect to an ideal arrangement of objects. The system includes a reference points producer producing an arrangement of reference points corresponding to objects in the ideal arrangement, a reference projector producing a reference polar projection based on the reference points, a specimen points producer producing an arrangement of specimen points corresponding to objects in the actual arrangement, a specimen projector producing a specimen polar projection based on the specimen points, a transform producer developing a transform based on the projections that describes an affine relationship between the actual arrangement and the ideal arrangement, and a linker producing correspondence data based on the transform, the correspondence data linking the model points to the specimen points.

Among the advantages of the invention are one or more of the following. Even if some or all of the objects in the ideal arrangement are arranged arbitrarily, i.e., not in a regular pattern, a correspondence between the actual and ideal arrangements can be established in much less time than required by the brute force method described above. As a result, missing and extra objects in the actual arrangement can be identified quickly, and in a real-time inspection application, more time is made available for analyzing the quality of other objects found in the actual arrangement.

Other advantages and features will become apparent from the following description and from the claims.

BRIEF DESCRIPTION OF THE DRAWINGS

FIG. 8 is a diagram of an arrangement of specimen points derived from the actual image data of FIG. 7.

FIG. 11 is a diagram of correspondence data produced according to the computer procedure of FIGS. 4A–4C.

DETAILED DESCRIPTION

Figure 1:
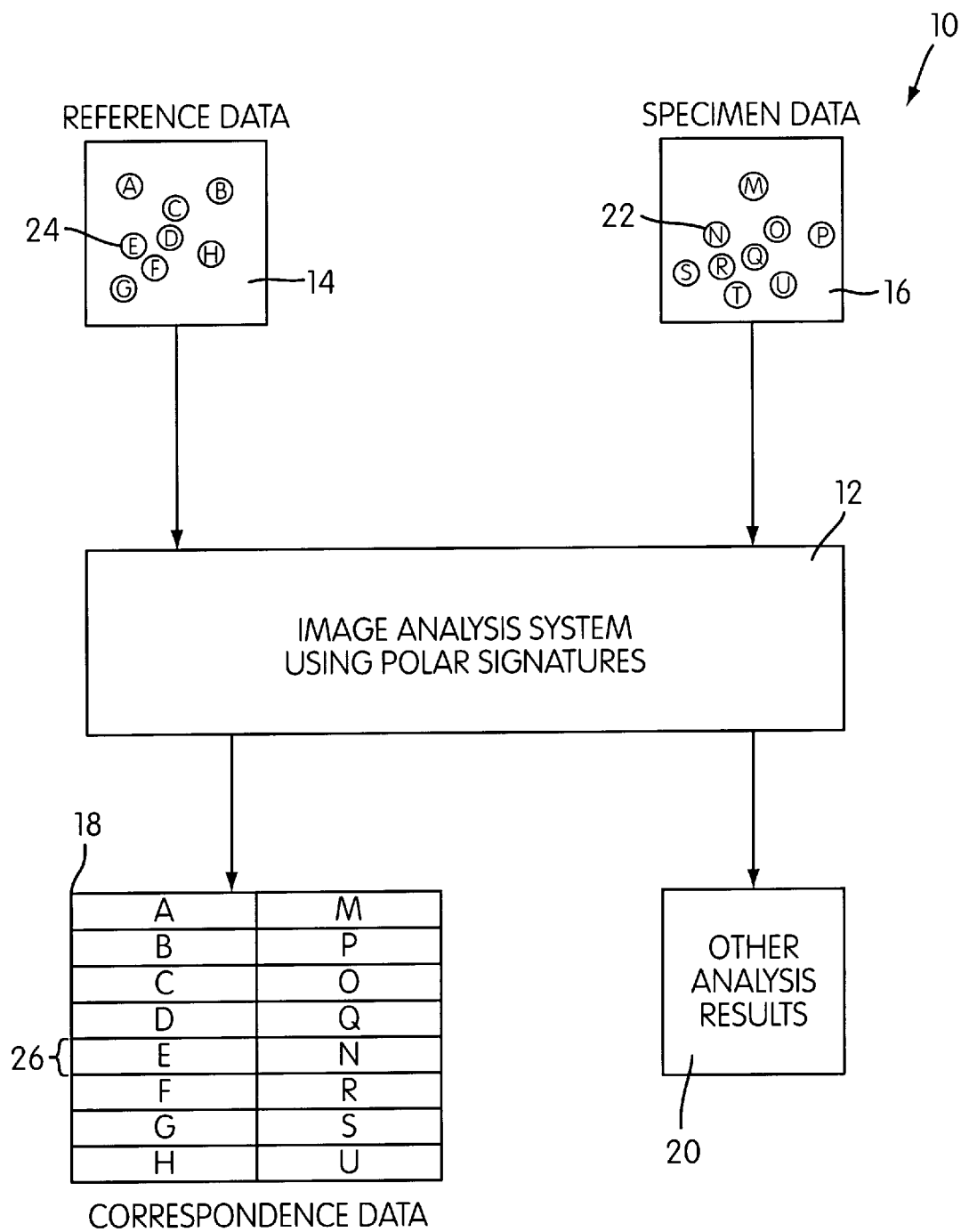
FIGS. 1 and 2 are block diagrams of an image processing system.

FIG. 1 illustrates image processing system 10 which is useful for finding instances of correspondence between expected (e.g., ideal) and actual locations of objects of interest (e.g., BGA balls), and which is particularly useful for finding such instances in cases in which at least some of the expected locations are arranged arbitrarily or irregularly, i.e., not in a regular pattern. The image processing system 10 includes an image analysis system 12 that receives reference data 14 (which may include training data) and specimen data 16 (e.g., image data) indicating the expected and actual locations, respectively, and produces correspondence data 18 that links objects represented in the specimen data 16 to objects represented in the reference data 14, and other analysis results 20. For example, in the case of FIG. 1 where the specimen data 16 and reference data 14 indicate arbitrarily-arranged objects and have differences in accordance with an affine transformation defined below (including differences of rotation, scale, and translation), the image analysis system 12 detects that object N 22 of the specimen data 16 corresponds to object E 24 of the reference data 14, and includes an appropriate entry 26 in the correspondence data 18.

A first arrangement of objects represents the results of an affine transformation of a second arrangement of objects if the first arrangement can be made to match the second arrangement by subjecting the first arrangement to one or more of the following actions: rotating, scaling, and translating (i.e., shifting). For example, in a cartesian coordinate system, an arrangement A may consist of four objects having (x,y) positions that define a 2×3 rectangle with corners at the origin, (2,0), (0,3), and (2,3), and an arrangement B may consist of four other objects having (x,y) positions that define the corners of a 60×40 rectangle with corners at (20,0), (80,0), (20,40), and (80,40). If so, arrangement A represents the results of an affine transformation of arrangement B, because arrangement A can be made to match arrangement B by rotating arrangement A by 90 degrees about the origin, scaling the result by a factor of 20 while holding the object at the origin, and then shifting the result by 80 units in the x direction. Affine differences and affine characteristics of arrangements are differences and characteristics, respectively, that are related to rotation, scale, or translation.

Figure 2:
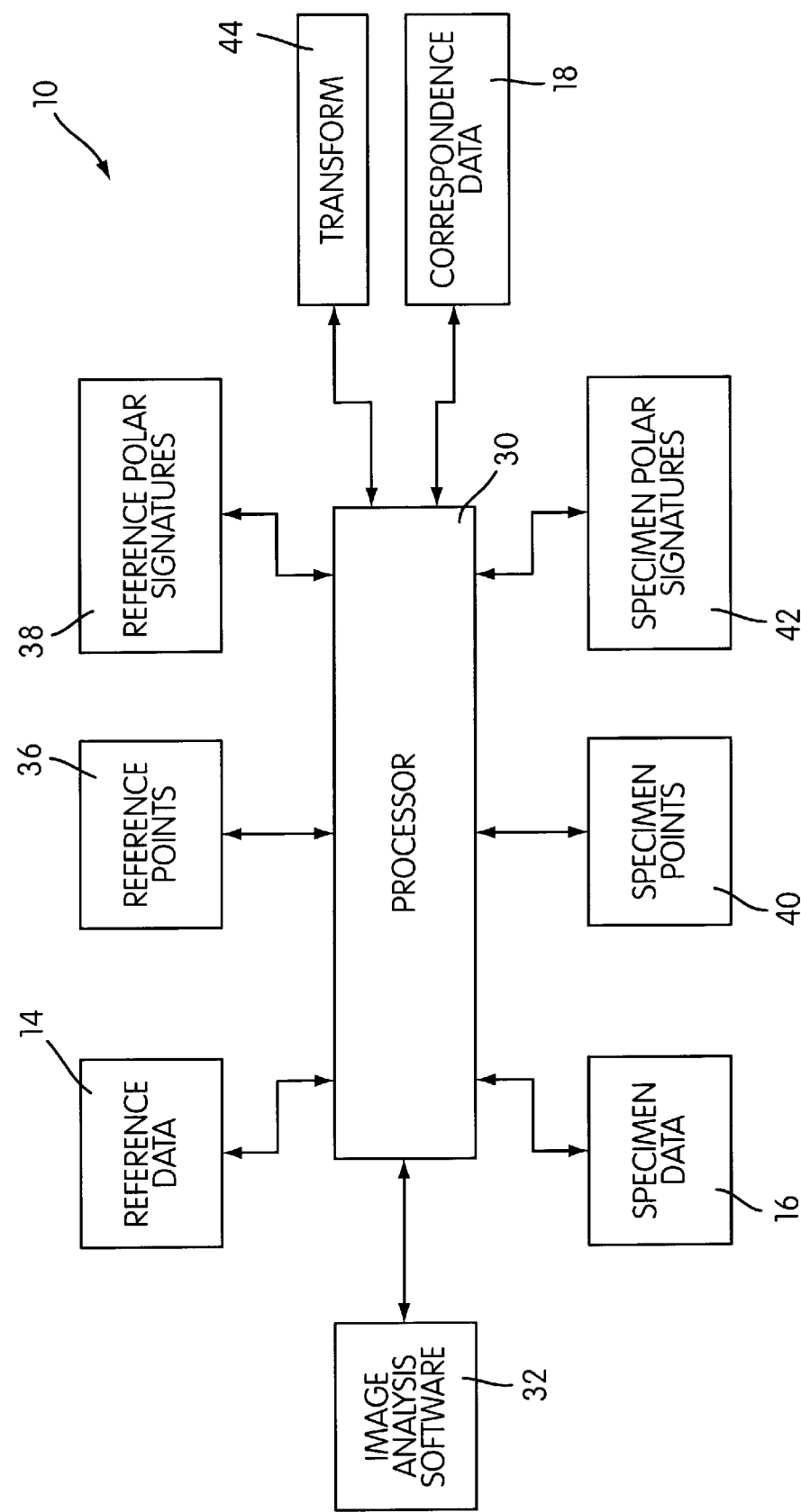

FIG. 2 shows that the image processing system 10 includes a processor 30 that executes according to image analysis software 32. Depending on the nature of the reference data 14 and specimen data 16, the image processing system 10 may also include other devices (e.g., a camera) described in commonly-assigned U.S. patent application Ser. No. 08/895,052, entitled "Analysis of an Image of a Pattern of Discrete Objects", filed Jul. 16, 1997 ("the July 1997 application"), incorporated by reference.

As described in more detail below, the image processing system 10 analyzes the specimen data 16 by comparing characteristics extracted from the reference data 14 to characteristics extracted from the specimen data 16. Each extracted characteristic is associated with one of the objects of interest, and is a polar signature (described below) that is nearly invariant of a rotational position and is fully invariant of other affine characteristics of the reference data 14 and specimen data 16 (invariance is defined below). By comparing the polar signatures of the reference data 14 with the polar signatures of the specimen data 16, the image processing system 10 determines objects of the specimen data 16 that correspond to objects of the reference data 14. The use of the polar signatures facilitates establishment of the correspondence because the polar signature of an object remains the same even if the arrangement containing the object undergoes affine changes such as changes in scale and shifting, and the polar signature is altered only slightly if the arrangement undergoes rotational changes. Thus, much as a light beacon's blinking sequence allows the beacon to be identified from any viewing angle, an object of interest's polar signature allows the object to be identified regardless of affine changes to the arrangement containing the object.

A characteristic of an arrangement is invariant under an affine transformation of the arrangement if the characteristic is unchanged in any arrangement resulting from the affine transformation. The polar signature mentioned above and described below is an example of a characteristic that is invariant to within an angular constant. Examples of fully invariant characteristics (which are also invariant to within an angular constant—the constant being zero) in the case of arrangements A and B described above include the 2:3 ratio of the sides of the rectangle defined by the objects in the arrangement, and the number of objects in the arrangement (i.e., four).

Figure 3:
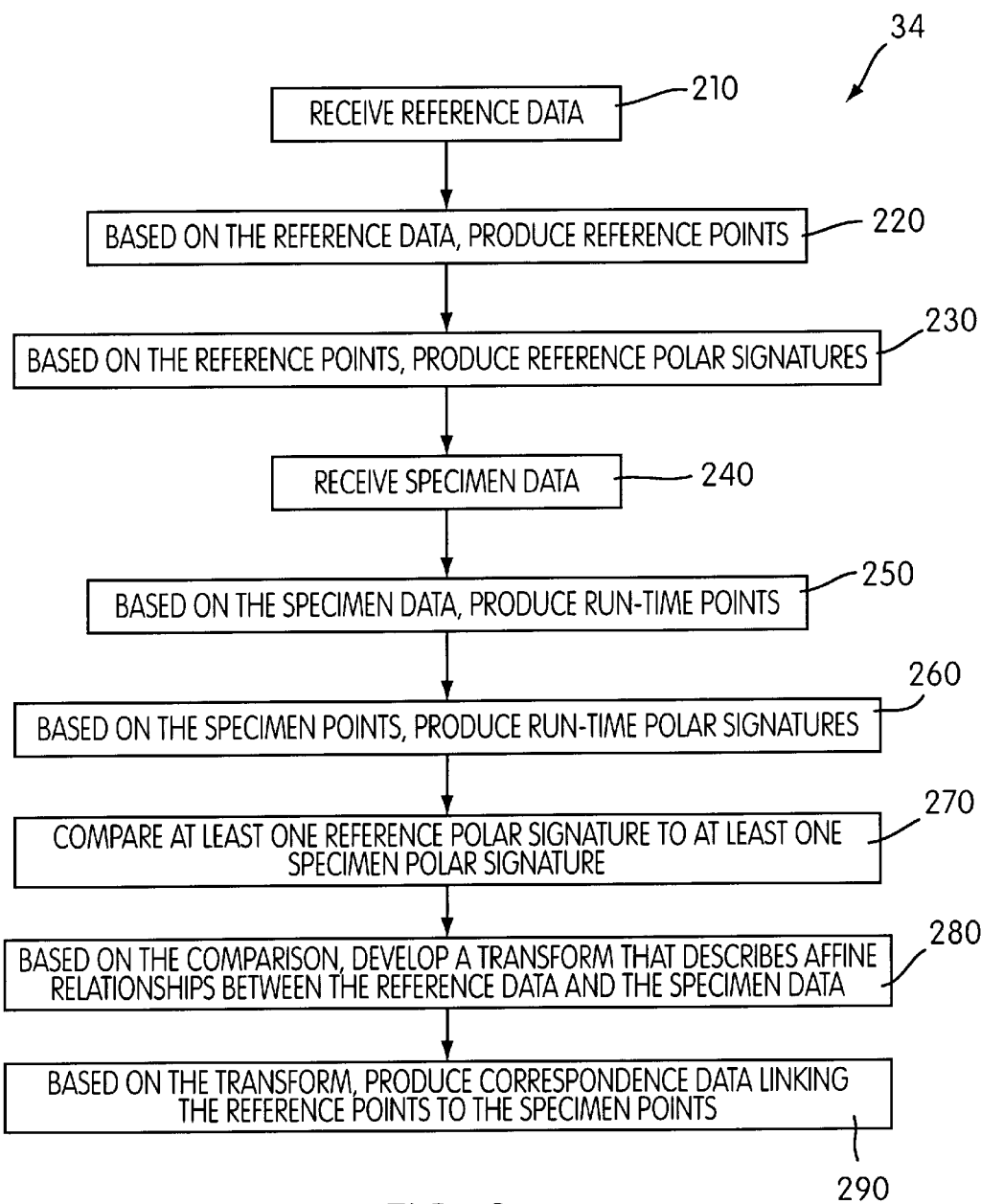
FIGS. 3, 4A–4C are flow diagrams of computer procedures.

According to a procedure 34 shown in FIG. 3, the correspondence data 18 is produced as follows (with reference also to FIG. 2). The image processing system 10 receives reference data 14 (e.g., a computer file that provides a list of x-y coordinates) (step 210) and produces an arrangement (possibly an arbitrary arrangement) of reference points 36 (i.e., x-y coordinates) indicating expected locations of the objects of interest (step 220). Based on the reference points, reference polar signatures 38 (described below) are produced (step 230). The image processing system 10 receives specimen data 16 (e.g., a computer file in an image data element based format such as ".BMP") (step 240) and produces (as described below) an arrangement of specimen points 40 representing actual x-y locations of objects (step 250). Based on the specimen points, specimen polar signatures 42 (described below) are produced (step 260). At least one of the reference polar signatures is compared to at least one of the specimen polar signatures 42 (step 270). Based on the at least one comparison, a transform 44 is developed that describes affine relationships between the reference data 14 and the specimen data 16 (step 280). Based on the transform 44, the correspondence data 18 is produced to link the reference points to the specimen points (step 290).

Figure 4A:
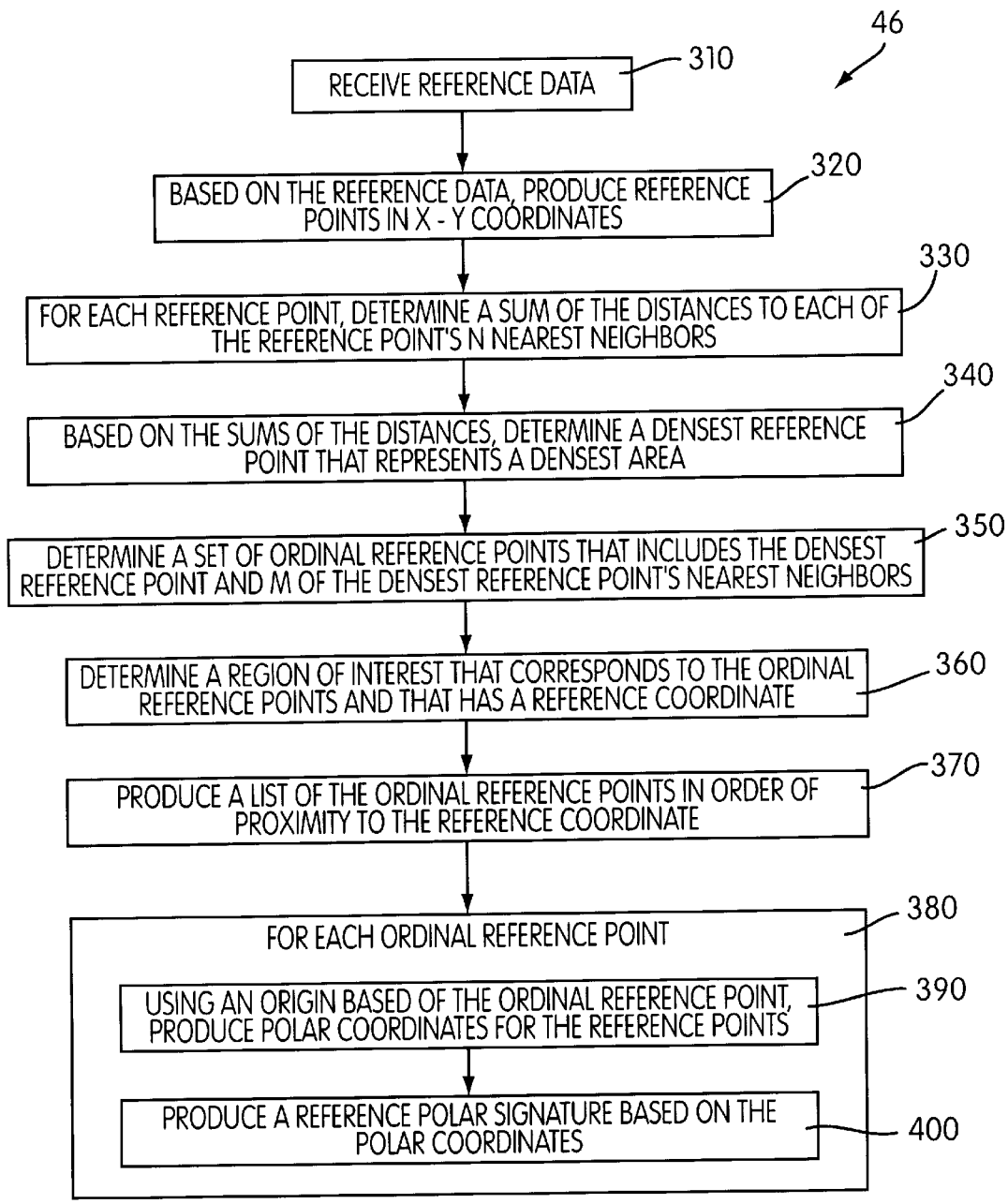
Figure 4B:
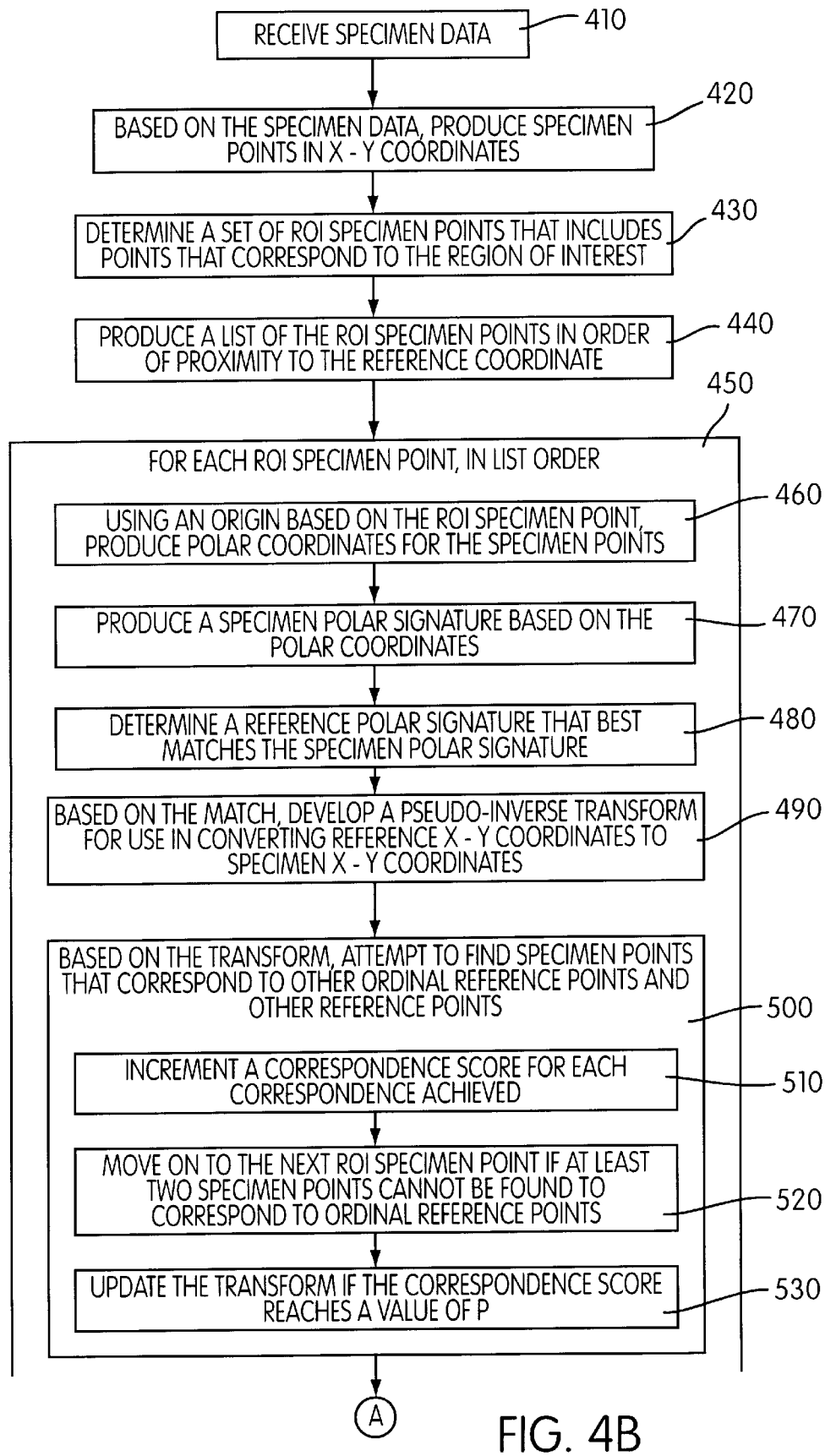
Figure 4C:
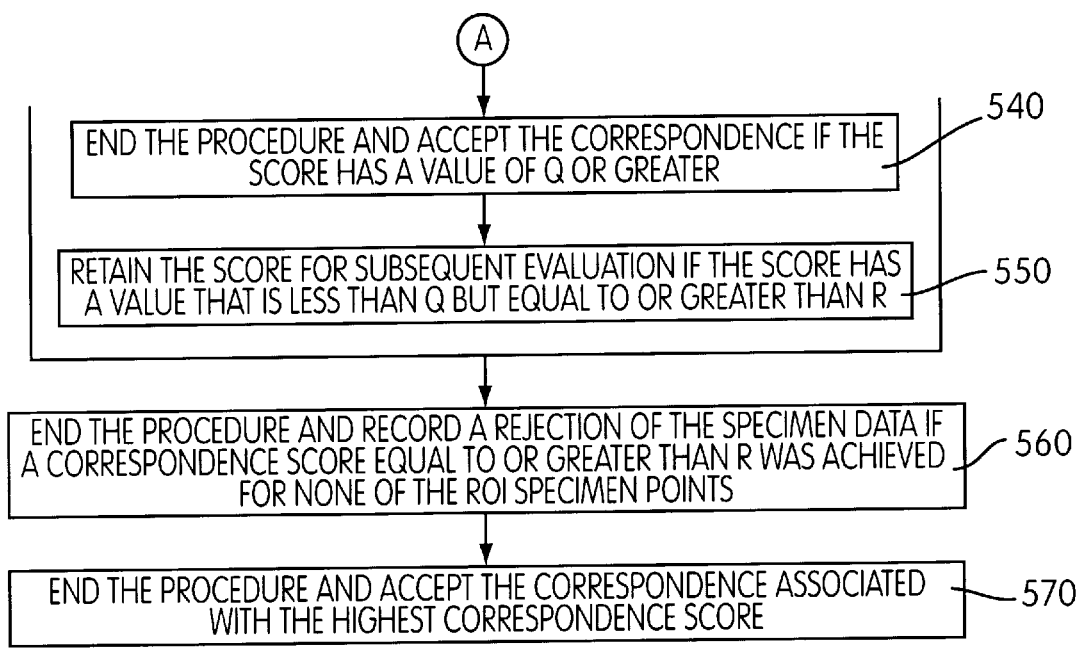

The correspondence data 18 is produced by the image processing system 10 according to detailed procedure 46 (FIGS. 4A–4C) (described below with reference also to FIGS. 55–11) in which polar signatures are created for only a subset of the points and locations, to save processing time. In a reference analysis phase (FIG. 4A) of the procedure 46, the procedure 46 determines information to be used subsequently in a specimen analysis phase (FIGS. 4A–4B). In the reference analysis phase, reference data 14 is received (step 310) and, based on the reference data 14, reference points (e.g., arbitrarily-arranged points 50A–50V of FIG. 5) are produced in x-y coordinates (step 320). The reference points may be produced by copying x-y coordinates provided in the reference data 14, or by deriving x-y coordinates from reference data information that only indirectly indicates the locations of the reference points. For each reference point, a sum of the distances to each of the reference point's N nearest reference points (e.g., where N is equal to 3, points 50Q, 50T, 50P for point 50S) is determined (step 330). Based on the sums of the distances, a densest reference point (e.g., point 50I) is determined that represents an area that is populated most densely with reference points (step 340).

A set of reference points known as ordinal reference points is defined that includes the densest reference point and the densest reference point's M nearest neighbors (e.g., where M is equal to 4, points 50E, 50H, 50J, 50M for densest reference point 50I) (step 350). A working region (also known as a region of interest or "ROI") (e.g., region 52) is determined that corresponds to and contains the ordinal reference points and that has a reference coordinate (e.g., coordinate 54 representing the center of region 52) (step 360). The working region corresponds to the smallest enclosed area (e.g., a rectangle) that encloses all of the ordinal reference points plus a surrounding margin of predetermined size (e.g., a size equal to three times the width of one of the objects of interest).

Figure 6:
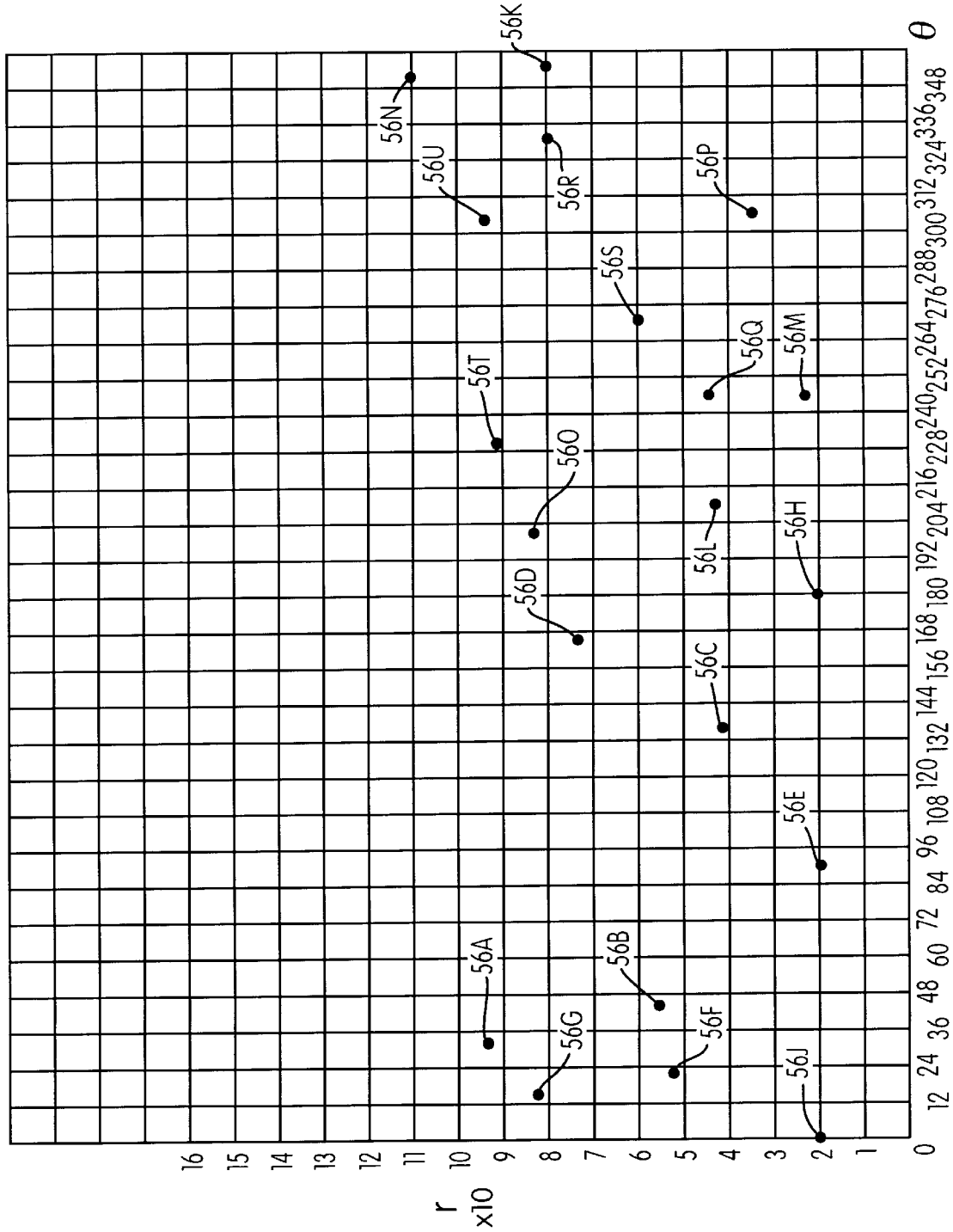
FIG. 6 is a diagram of a polar transformation of the arrangement of FIG. 5.
Figure 9A:
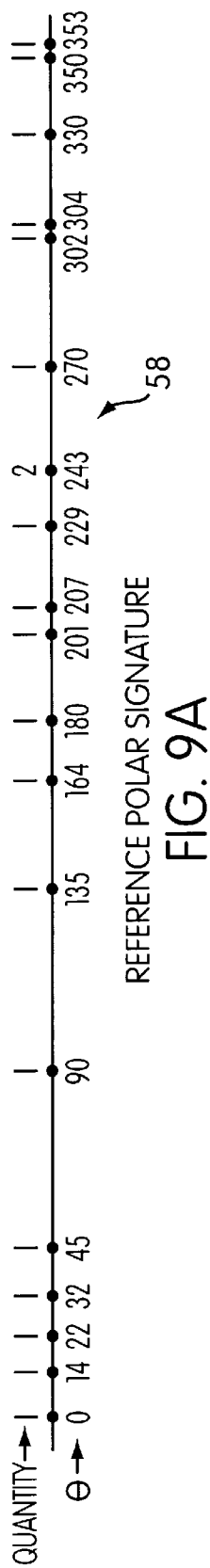
FIGS. 9A and 9B are diagrams of angular information derived from polar transformations of the arrangements of FIGS. 5 and 8, respectively.

A list of the ordinal reference points is produced, in which the ordinal reference points are ordered by proximity to the reference coordinate (e.g., in the following order for coordinate 54: points 50I, 50E, 50M, 50H, 50J) (step 370). As described below, for each ordinal reference point (e.g., point 50I) (step 380), the ordinal reference point is used as an origin to produce polar coordinates for the other reference points (e.g., as shown in FIG. 6 for reference point 50I, polar coordinates 56A–56H, 56J–56U corresponding to reference points 50A–50H, 50J–50U, respectively) (step 390). A reference polar signature (e.g., signature 58 of FIG. 9A) is produced based on the polar coordinates (step 400), as described below. Each polar coordinate (e.g., coordinate 56H) specifies the location of a reference point relative to the origin (e.g., point 50I for the coordinates of FIG. 6) in terms of an angle offset e (e.g., 180 degrees for point 50H) rounded to the nearest angle offset increment (e.g., a degree) and a distance r (e.g., 20 units for point 50H). The reference polar signature is produced by determining a number of reference points that are found at each angle offset increment. For example, in FIG. 6, two reference points 50Q, 50M have an angle offset of 243 degrees, which is recorded as shown in FIG. 9A. For producing the correspondence data 18 during the specimen analysis phase as described below, the reference polar signature is a particularly useful characteristic of an ordinal reference point, because the reference polar signature is invariant of position changes related to scale and translation, and is affected only by an offset constant (i.e., an angular constant) in the case of position changes due to rotation.

Thus, by the conclusion of the reference analysis phase, the following items of information have been produced: the reference points including the ordinal reference points, the working region, the reference coordinate, the ordered list of the ordinal reference points, and the reference polar signatures. These items are used in the specimen analysis phase described below.

Figure 7:
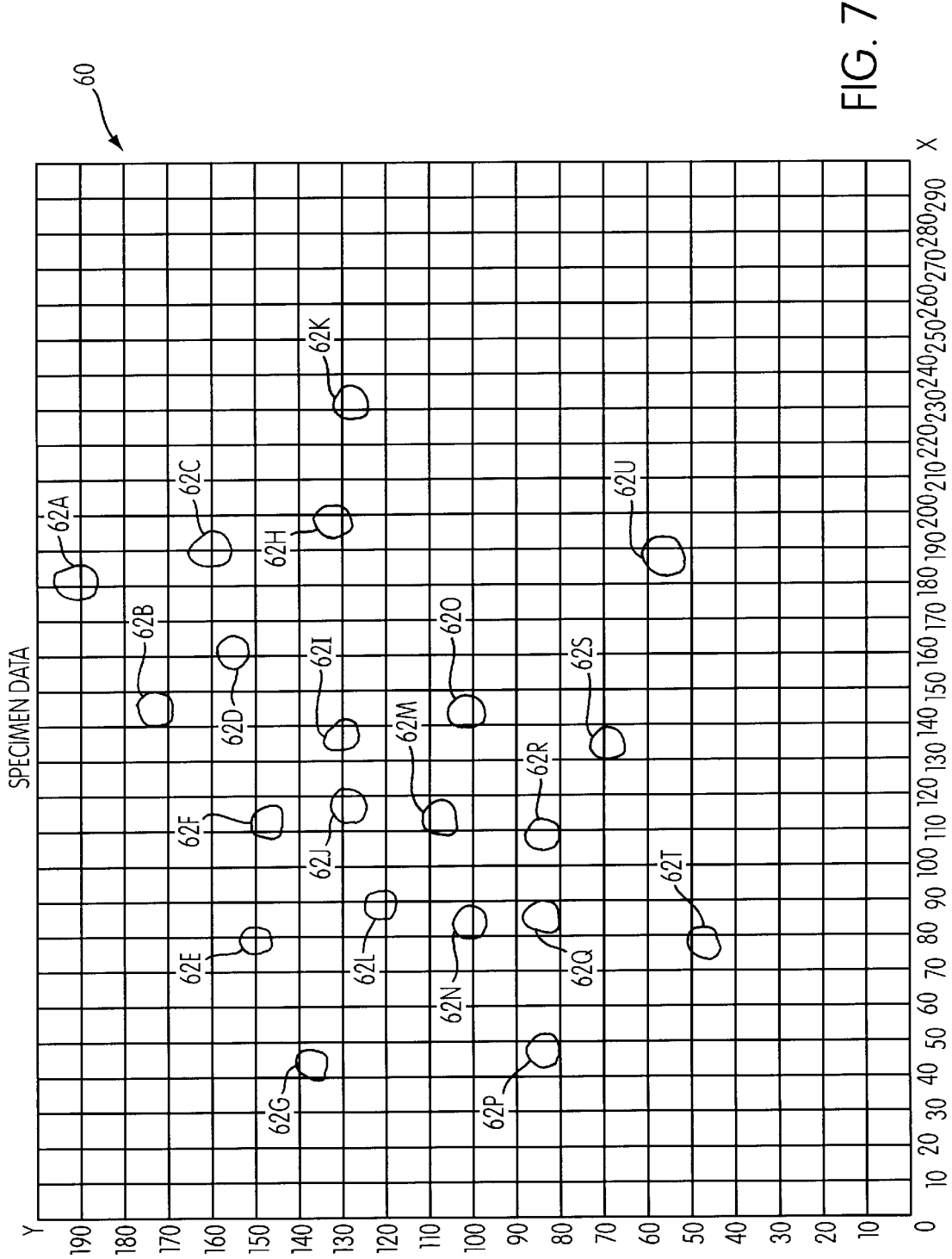
FIG. 7 is a diagram of actual image data.

In the specimen analysis phase (FIGS. 4B–4C), specimen data 16 (e.g., data representing image 60 of FIG. 7) is received (step 410). The specimen data 16 includes information about the locations of objects of interest (e.g., objects 62A–62U of FIG. 7). Based on the specimen data 16, specimen points (e.g., in FIG. 8, points 64A–64U corresponding to objects 62A–62U, respectively) are produced in x-y coordinates (step 420). Each specimen point may represent the center of a corresponding object of interest, which center is found by using other image analysis software such as "blob tools" described in a manual referred to as Cognex 3000/4000/5000 Vision Tools Revision 7.6 part no. 590-0136 (1996) ("the Cognex manual"), incorporated by reference, or a normalized correlation search, which is explained in the Cognex manual at 17–25, incorporated by reference.

A set of working region specimen points is determined that includes specimen points (e.g., points 64I, 64J, 64L, 64M, 64O) that correspond to the working region (e.g., working region 52) that was determined in the reference analysis phase (step 430). In some cases, the specimen data 16 and reference data 14 represent respective fields of view that are expected to coincide sufficiently (within tolerance limits) to allow the working region (i.e., the reference-data-based working region) to be applied directly to the specimen data 16. In such cases, a useful number of specimen points is expected to be found in the working region without having to expand or otherwise alter the working region. In other cases (e.g., where the specimen data 16 uses a different scale of x-y coordinates), the working region cannot be applied directly to the specimen data 16; thus a specimen-data-based working region is first determined that corresponds to the reference-data-based working region, and is used instead for determining the set of working region specimen points.

A list of the working region specimen points is produced, in which the working region specimen points are ordered by proximity to the reference coordinate that was also determined in the reference analysis phase (e.g., in the following order for coordinate 54: points 64J, 64M, 64I, 64L, 64O) (step 440).

A correspondence testing procedure (steps 460–550) is executed for each working region specimen point (as necessary as described below), in the list order (step 450). Using an origin based on the working region specimen point (e.g., point 64J), polar coordinates (not shown) are produced for the specimen points (step 460) and a specimen polar signature (e.g., signature 66 of FIG. 9B) is produced based on the polar coordinates (step 470) as described above in connection with the reference analysis phase.

A reference polar signature is determined that best matches the specimen polar signature (step 480). This best match is found by comparing the specimen polar signature to each of the reference polar signatures produced in the reference analysis phase. In each comparison, negative and positive angle shifts (i.e., offset constants as described above) of up to a tolerance limit (e.g., 20 degrees) are applied in angle offset increments. (Conceptually, the application of the angle shifts can be understood as sliding the specimen polar signature relative to the reference polar signature.) A sum of absolute differences is calculated for the respective point quantities of the reference and specimen polar signatures at each angle offset increment, to produce a comparison score for the angle shift. The best match (reference polar signature and angle shift) is selected based on the comparison scores. Alternatively, the best match may be found by using a one-dimensional correlation.

Figure 5:
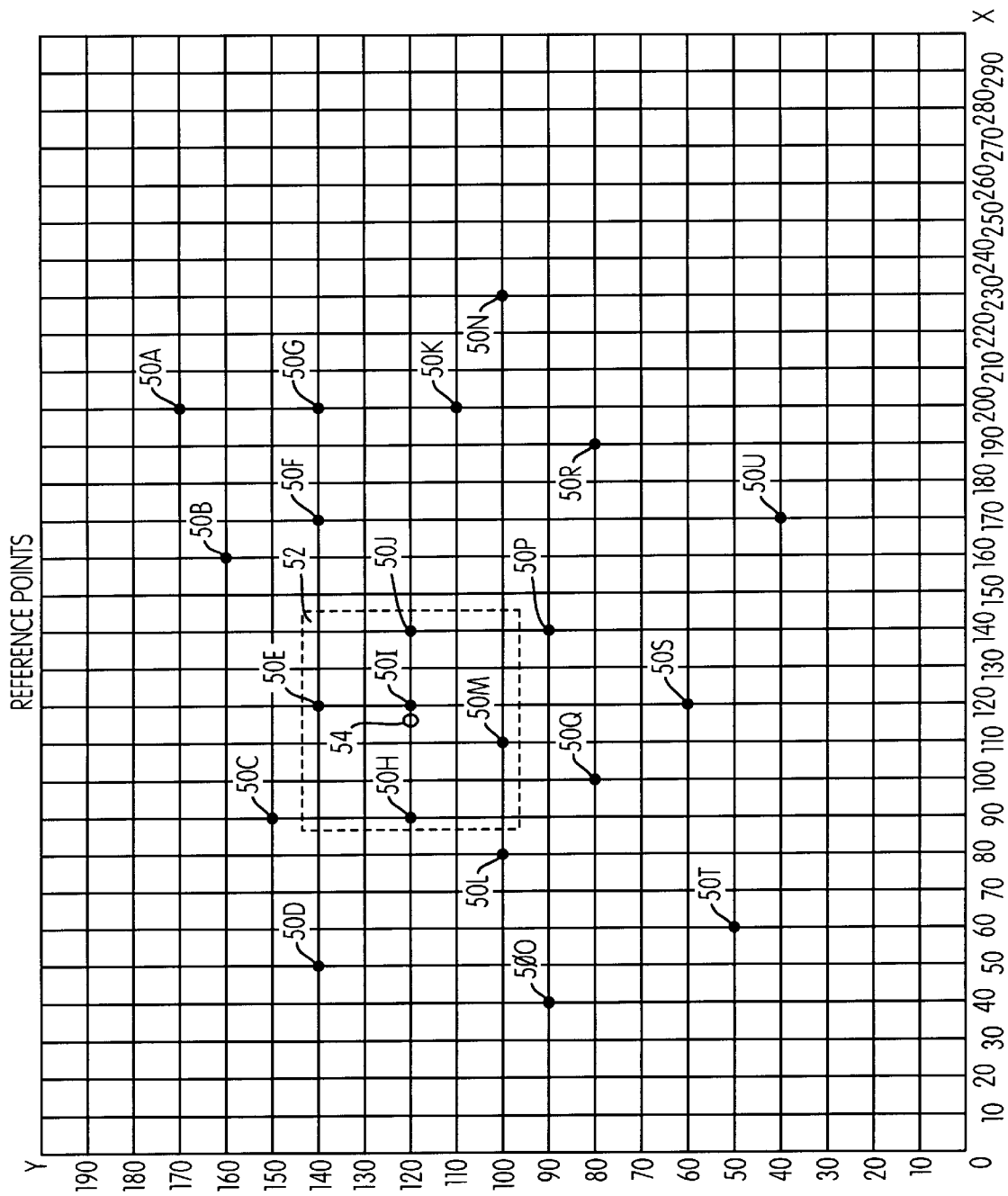
FIG. 5 is a diagram of an arrangement of reference points.
Figure 9B:
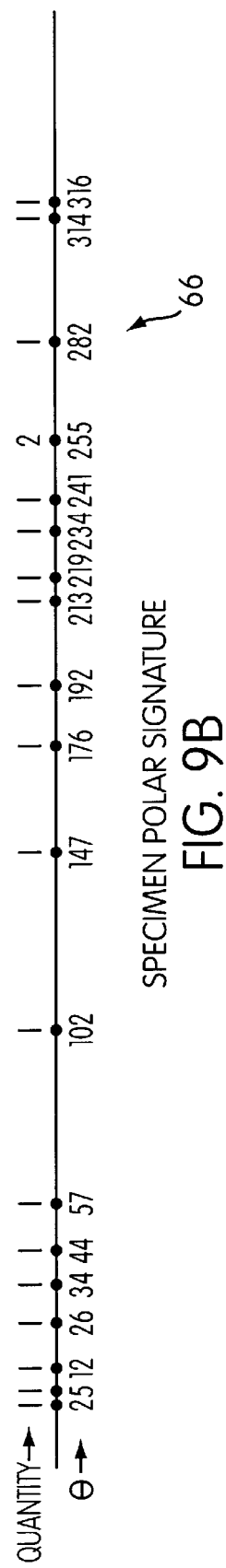

In the case of the reference and specimen points of FIGS. 5 and 8, respectively, the best match to the specimen polar signature 66 of FIG. 9B is the reference polar signature 58 of FIG. 9A, with an angle shift of +12 degrees.

Note that the angle shift can still be determined even if one or more of the reference points lacks a corresponding specimen point. Reference points without corresponding specimen points do not contribute to the angle shift determination.

Figure 10:
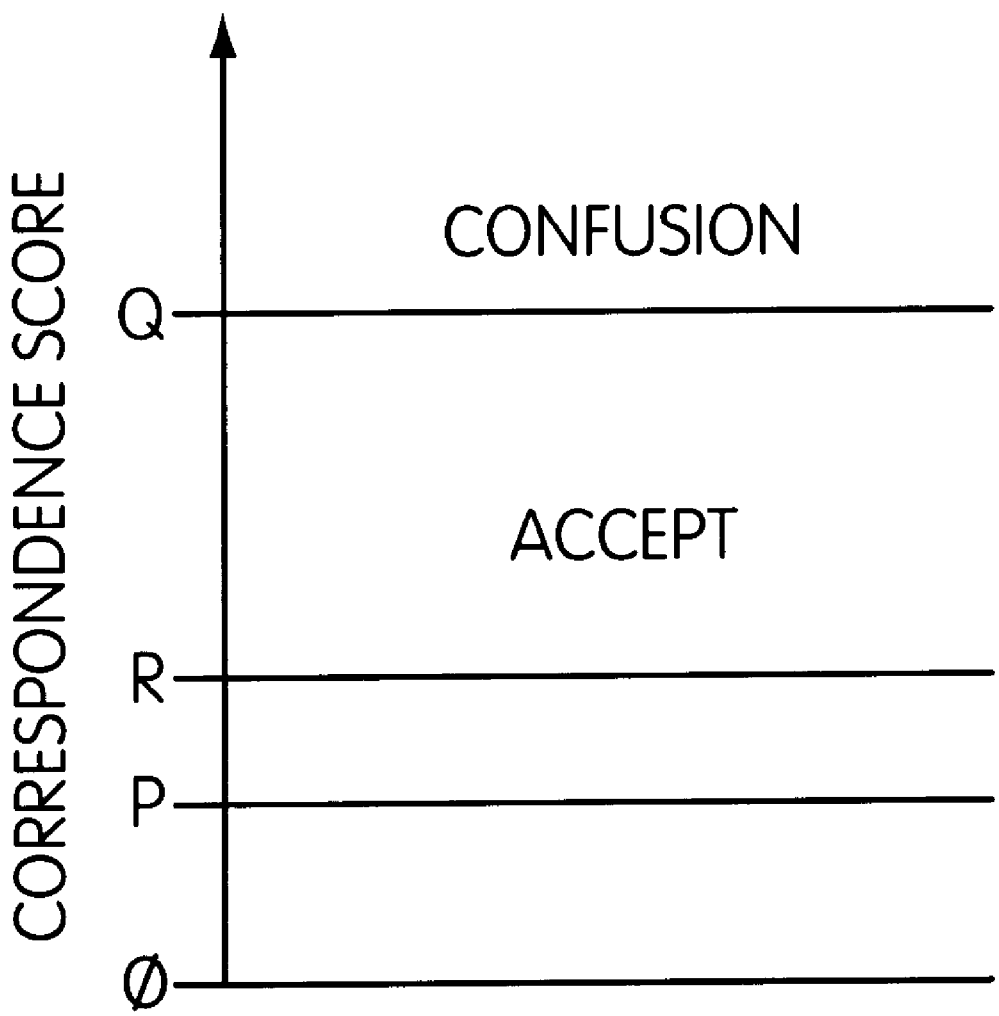
FIG. 10 is a diagram helpful for understanding the computer procedure of FIGS. 4A–4C.

Based on the best match, a pseudo-inverse transform (described below) is developed for use in converting x-y coordinates of the reference points to x-y coordinates of the specimen points (step 490). Based on the pseudo-inverse transform, a subprocedure (steps 510 to 530) is executed to attempt to find specimen points that correspond to other reference points (initially, the other ordinal reference points) (step 500). For each reference point for which a corresponding specimen point is to be found, the pseudo-inverse transform is used to specify an additional working region (e.g., working region 68 for reference point 50K) within which the corresponding specimen point must be found in order for a correspondence to be achieved. A correspondence score is incremented for each correspondence achieved (step 510), and has a maximum possible value equal to one less than the quantity of reference points (e.g., equal to 20 in the case of the reference and specimen points of FIGS. 5 and 8, respectively). If a correspondence is not achieved for at least two of the other ordinal reference points, the correspondence testing procedure is terminated for the current working region specimen point and is re-started for the next working region specimen point in the list of the working region specimen points (step 520). After the correspondence score reaches a value of P (FIG. 10), the pseudo-inverse transform is refined based on where specimen points were actually found in relation to the additional working regions used for the correspondences achieved (step 530).

The pseudo-inverse transform is described in Cognex 3000/4000/5000 System Software Revision 7.4, chapter 7, p. 204 et seq.; William W. Hager, Applied Numerical Linear Algebra sec. 6–11 (Prentice-Hall 1988); and in Gilbert Strang, Linear Algebra and its Applications sec. 3.4 (Academic Press 1980), all incorporated by reference.

The correspondence testing procedure applies an accept/confusion test to evaluate the set of correspondences produced, which set may fall into one of three categories ("good enough to accept without further evaluation", "worthy of further evaluation", or "rejected") described below. According to the accept/confusion test, the procedure is terminated and the current correspondence results are accepted (as "good enough") if the correspondence score has a value of at least Q (i.e., a value in the "confusion" range shown in FIG. 10) (step 540), or the correspondence score is retained for subsequent evaluation if the score has a value that is less than Q but is at least R (i.e., a value in the "accept" range shown in FIG. 10) (step 550). (While in FIG. 10 P is shown having a value less than Q and R, P can have a value equal to or greater than Q or R or both.) For an instance of execution of the correspondence testing procedure, a value of at least Q for a correspondence score indicates that it is unnecessary to search for a better set of correspondences.

For example, the maximum possible value for the correspondence score may be 20, Q may be 15, R may be 10, and P may be 5. If so, when the correspondence score reaches 5, the transform is updated. According to this example, after an attempt to find a correspondence has been executed for each of the reference points, if the resulting correspondence score is at least 15, the set of correspondences is accepted as good enough, rendering unnecessary any attempts to find other sets of correspondences. Further according to this example, if the resulting correspondence score is at least 10 but is less than 15, the set of correspondences is retained for evaluation with respect to subsequent 14 produced sets of correspondences.

Procedure 46 is terminated and a rejection of the specimen data 16 is recorded if a correspondence score of at least R was achieved for none of the working region specimen points (step 560). Otherwise, procedure 46 is terminated and the set of correspondences associated with the highest correspondence score is accepted (step 570).

In the case of the reference and specimen points of FIGS. 5 and 8, respectively, procedure 46 produces the correspondence data 70 shown in FIG. 11. Missing specimen point 72 indicates that the specimen data 16 lacks an object of interest that corresponds to reference point 50R. Missing reference point 74 indicates that the specimen data 16 has an extra object of interest represented by specimen point 64Q.

In general, each object of interest represented in the specimen data 16 may also be subjected to a quality analysis (e.g., of size, shape, and location) described in the July 1997 application and below, which quality analysis produces the other analysis results 20 of FIG. 1. Size, shape, and location information may be determined for each object. For instance, if each object is expected to be circular, an edge-detection and least-squares analysis may be performed for each object to determine a best-fit circle, as explained in George B. Thomas, Calculus and Analytic Geometry, chapter 14 (Addison-Wesley 1953), incorporated by reference. In such a case, the radius and position of the best-fit circle determine the size and precise location, respectively, of the object, and the quality of the fit of the best-fit circle determines the degree to which the object is circular. The quality of the fit is inversely proportional to the sum of the squares of the distances from the actual edges of the object to the nearest point on the best-fit circle.

In the quality analysis, this determined information may be compared to parameters that indicate tolerances for errors in position, errors in size, and errors in pitch. Note that errors in position may be detected independently of errors in pitch. This may be done because two objects may be within position tolerances but be simultaneously too close to each other to fall within the pitch tolerances. Thus, detecting pitch and position errors independently allows the quality analysis to issue a passing result where, e.g., all of the objects in a portion of the arrangement are shifted horizontally within the position tolerances.

With respect to shape, the quality analysis may be able to detect an object that is misshapen and may not be acceptable.

The specimen data 16 may also be analyzed for other items that do not qualify as objects of interest. This may be accomplished after the procedure above by masking out of the specimen data 16 any data elements that correspond to objects of interest, and then examining the resulting masked specimen data 16 for anything left over. (Alternatively, a constant golden template comparison ("GTC") method, histogram analysis, or connected blob analysis could be used to find such objects. GTC is explained in William M. Silver and Jean-Pierre Schott, Practical Golden Template Comparison (Cognex 1991), incorporated by reference). As a result, the image analyzer may record a failure in the analysis results data structure.

The procedures and other information described above are relevant to any application in which an arrangement of objects of interest is to be analyzed with respect to a reference arrangement. The specimen data 16 may include any information organized by position and at least one additional attribute of interest such as brightness, color, quality, humidity, height, depth, or concentration. For example, the specimen data 16 may include topological information corresponding to a relief map or a navigational chart. The image processing system 10 may be combined with a camera for automated inspection of articles (e.g., BGAs or pill blister packs) that are provided for inspection by a conveyor system or by other means, as described in the July 1997 application. In at least some cases involving BGAs, it is advantageous for M to have a value of 12. Another inspection application involves a circuit testing device having an arrangement of electrical probe tips, with each probe tip intended to contact an electrical circuit in a predetermined location. The circuit testing device tends to operate ineffectively if one or more of the probe tips in the arrangement is out of position or missing.

The image processing system 10 may have a processor ("CPU") such as an Intel® 486, Pentium®, Pentium® Pro, or Pentium® II processor and may run software including an operating system (i.e., operating environment software) such as Microsoft® Windows® NT, Microsoft® Windows® 95, UNIX®, OS/2®, or Java™.

The technique (i.e., the procedure described above) may be implemented in hardware or software, or a combination of both. In at least some cases, it is advantageous if the technique is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices.

In at least some cases, it is advantageous if each program is implemented in a high level procedural or object-oriented programming language such as Microsoft C or C++ to communicate with a computer system. However, the programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, all of the specimen polar signatures may be compared to all of reference polar signatures before the correspondence testing procedure is executed, to determine the best overall match before proceeding. A multi-level test similar to the accept/confusion test described above may be applied during the comparisons, so that time can be saved by cutting short the comparisons if a "good enough" reference-to-specimen signature match is found, or by summarily rejecting a particularly poor potential match. The levels of the multi-level test may be set according to the similarity of the reference polar signatures (e.g., the "good enough" level may be set low for a reference polar signature that bears little resemblance to the other reference polar signatures).

What is claimed is:

1. A method for inspecting a two-dimensional specimen digital representation of an actual arrangement of a specimen set of discrete objects along first and second dimensions in a given plane, the digital representation spanning a given area in the given plane, said inspecting comprising determining certain characteristics of the discrete objects within the specimen set, said certain characteristics including at least relative locations of the discrete objects within the set, said method comprising:

selecting, from a reference digital representation of a reference set of reference objects along first and second dimensions in a given plane and spanning a given area in the given plane, a subset digital representation representing a reference subset of the set of the reference discrete objects, the subset of the reference discrete objects falling within a contiguous area which is only part of the given area of the reference digital representation, said selecting comprising comparing, from within said reference set, one set of spatial relationships, of one given reference object to corresponding neighbor objects, to another set of spatial relationships, of another given reference object to other corresponding neighbor objects, in order to choose a chosen given reference object and chosen corresponding neighbor objects nearby said given reference object, the chosen given reference object and chosen corresponding neighbor objects collectively forming a densest sample of said reference set in comparison to a non-chosen given reference object and non-chosen corresponding neighbor objects;

based upon the selected subset, extracting from said actual arrangement, actual characteristic data representing said certain characteristics, wherein said extracting comprises extracting a first characteristic from said actual arrangement and a second characteristic from an ideal arrangement of object locations represented by said reference representation, said first characteristic and said second characteristic being invariant, to within an angular constant, under affine transformation of respective arrangements of said first characteristic and said second characteristic; and comparing said actual characteristic data to reference characteristic data derived using the selected subset to identify said certain characteristics.

2. The method according to claim 1, wherein said specimen digital representation comprises digital data representing respective relative positions of said discrete objects within said specimen set, and wherein said reference digital representation comprises digital data representing respective relative positions of said discrete objects within said reference set.

3. The method according to claim 1, wherein said arrangement comprises an array of said discrete objects, and wherein said discrete objects comprise balls of a ball grid array device.

* * * * *